US010437084B1

(12) United States Patent
Hwang (10) Patent No.: US 10,437,084 B1
(45) Date of Patent: Oct. 8, 2019

(54) ELECTRO-OPTICAL CRYSTAL-MOUNTED APPARATUS AND SYSTEMS FOR USE IN LASER CAVITIES/ASSEMBLIES

(71) Applicant: Lockheed Martin Coherent Technologies, Inc., Louisville, CO (US)

(72) Inventor: David Hwang, Louisville, CO (US)

(73) Assignee: Lockheed Martin Coherent Technologies, Inc., Louisville, CO (US)

( * ) Notice: Subject to any disclaimer, the term of this patent is extended or adjusted under 35 U.S.C. 154(b) by 0 days.

(21) Appl. No.: 15/603,363

(22) Filed: May 23, 2017

(51) Int. Cl.
| | |
|---|---|
| G02F 1/03 | (2006.01) |
| G02B 7/00 | (2006.01) |
| G02F 1/35 | (2006.01) |
| H01S 3/107 | (2006.01) |
| H01S 3/06 | (2006.01) |
| H01S 3/09 | (2006.01) |
| H01S 3/02 | (2006.01) |
| H01S 3/04 | (2006.01) |

(52) U.S. Cl.
CPC ........... *G02F 1/0305* (2013.01); *G02B 7/003* (2013.01); *G02B 7/008* (2013.01); *G02F 1/03* (2013.01); *G02F 1/35* (2013.01); *H01S 3/107* (2013.01); *H01S 3/025* (2013.01); *H01S 3/0405* (2013.01); *H01S 3/0602* (2013.01); *H01S 3/09* (2013.01)

(58) Field of Classification Search
CPC ............ G02F 1/03–1/0322; G02F 1/35; H01S 3/0405; H01S 3/0401; H01S 3/107
USPC ........................................ 359/245, 819, 820
See application file for complete search history.

(56) References Cited

U.S. PATENT DOCUMENTS

| | | | | | |
|---|---|---|---|---|---|
| 4,019,159 | A | * | 4/1977 | Hon .......................... | G02F 1/37 359/278 |
| 4,379,620 | A | * | 4/1983 | Erickson ............... | G02F 1/0322 359/249 |
| 4,466,102 | A | * | 8/1984 | Woste ..................... | H01S 3/081 372/107 |

(Continued)

OTHER PUBLICATIONS

"Pockels Cells." Pockels Cells, Mar. 14, 2016, www.thorlabs.com/newgrouppage9.cfm?objectgroup_id=6149.*

(Continued)

*Primary Examiner* — Zachary W Wilkes
(74) *Attorney, Agent, or Firm* — Morgan, Lewis & Bockius LLP (57) ABSTRACT

An electro-optical crystal-mounted apparatus includes a compactly configured mounting sub-assembly, and a compactly configured position adjustment sub-assembly onto which the mounting sub-assembly is mounted. The mounting sub-assembly includes a mount including a thermally conductive and electrically insulating material, an electro-optical crystal housed within a cavity of the mount, and a layer of electrically conductive material disposed on at least a portion of the mount. The mounting sub-assembly further includes a crystal sub-assembly oven mounted to, and at least partially enclosing the mount, and a heater thermally coupled to the crystal sub-assembly oven. An electrical wire electrically is coupled to the layer of electrically conductive material. The position adjustment sub-assembly positions the electro-optical crystal with respect to a laser beam configured to pass through the electro-optical crystal, and includes at least one tilt/tip adjuster for adjusting at least one of a tip and a tilt of the electro-optical crystal.

19 Claims, 6 Drawing Sheets

(56) References Cited

U.S. PATENT DOCUMENTS

| | | | | |
|---|---|---|---|---|
| 4,804,251 A | * | 2/1989 | Jacobs | G01D 15/14 |
| | | | | 359/254 |
| 4,849,719 A | * | 7/1989 | Belek | G02F 1/0305 |
| | | | | 359/245 |
| 5,140,470 A | * | 8/1992 | Luecke | G02B 7/004 |
| | | | | 359/818 |

OTHER PUBLICATIONS

"Free-Space Electro-Optic Modulators." Thorlabs—Apr. 9, 2016, www.thorlabs.com/newgrouppage9.cfm?objectgroup_id=2729.*

* cited by examiner

ELECTRO-OPTICAL CRYSTAL-MOUNTED APPARATUS AND SYSTEMS FOR USE IN LASER CAVITIES/ASSEMBLIES

TECHNICAL FIELD

The present description relates in general to optical systems, and more particularly to, for example, without limitation, electro-optical crystal-mounted apparatus and systems for use in laser cavities/assemblies.

BACKGROUND OF THE DISCLOSURE

Conventional apparatus and systems for mounting optical components (e.g., optical crystals) are generally configured so as to rigidly and precisely mount the optical component within the mounting apparatus or system. Alignment of the optical components is especially critical when the specific application of the mounted optical component (e.g., the crystal) is for use in a laser cavity/assembly where any misalignment can cause the laser light polarization or index of refraction to be improperly altered.

In order to prevent or minimize misalignment of the optical component with the laser light oriented to pass through the optical component, various specialized optical mounts have been proposed to secure the optical component in a desired orientation with respect to the laser beam. For example, in a conventional wavelength-converted laser system, the laser beam undergoes a transformation (e.g. of wavelength) in the optical component, e.g., the optical crystal. In the aforementioned transformation, a portion of the laser beam is converted to a different wavelength.

In conventional crystal mounting apparatus, EO crystals are generally mounted with bonded wires to plated faces of the crystal in order for an electrical voltage to be applied. Position of the EO crystal within the conventional mounting apparatus has been addressed by using commercial off-the-shelf mounts intended for general and generic applications that address one degree of freedom at a time. In these instances, multiple off-the-shelf mounts would need to be combined in order to address the aforementioned parameters affecting performance of the EO crystal. In the conventional mounting apparatus, thermal stability of the crystal has either not been directly addressed, or if addressed, it has been addressed passively using room temperature control and external boxes to prevent ambient air flow.

The description provided in the background section should not be assumed to be prior art merely because it is mentioned in or associated with the background section. The background section may include information that describes one or more aspects of the subject technology.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

Various aspects of the present disclosure relate to optical systems, and more particularly to, for example, without limitation, electro-optical crystal-mounted apparatus for use in laser cavities/assemblies. One or more implementations of the present disclosure enable the energizing, mounting, heating and alignment of an active electro-optical (EU) crystal for use in laser cavities or laser assemblies.

EU crystals have the ability to manipulate laser light of a laser beam passing through them (for example, by changing the laser light's polarization or by changing the EO crystal's index of refraction). Unlike non-EO crystals, EO crystals can change these properties very quickly in proportion to an electrical voltage potential placed across the EO crystal. Typically, the EO crystal's optical performance (e.g., in changing the laser beam's polarization or index of refraction) is highly dependent (1) the crystal's alignment to the laser beam passing through it, (2) the crystal's temperature, (3) cuts on the crystalline axis of the crystal, and (4) voltage applied to the crystal, if any. EO crystals generally are not readily available or packaged in a manner capable of optimizing the aforementioned parameters, which highly affect the optical performance of the EO crystal.

Certain EO crystal-mounted applications necessitate stricter requirements for temperature of the EO crystal within the mount, and stricter EO crystal position/orientation in the mount than the typical applications. in these cases, more sensitive control of these parameters is needed (as in this non-typical application described in the present disclosure). Additionally, a compact package in which the EO crystal is mounted is necessary since light path length of the laser must be minimized. Given the space constraint, conventional off-the-shelf building block opto-mechanical mounts are too large to fit in the allocated laser cavity space.

Conventional EO crystal mounting devices do not adequately address the aforementioned EO crystal performance parameters when dealing with an atypical mounting of an EO crystal such as when the EO crystal is sensitive to slight variations in position or temperature. In fact, conventional off-the-shelf EO crystal mounts generally address only the parameter of voltage applied to the crystal. Crystal position and crystal temperature are ignored in these cases, which presents several issues in aligning the EO crystal to the laser beam in particular, conventional EO crystal mounts present a deficiency in addressing the rigorous position and thermal requirements, along with a space constraint of the laser cavity in which they EO crystal mount is to be positioned.

As will be appreciated, what is needed is an apparatus and/or system capable of mounting the EO crystal in a manner such as to address all three of the aforementioned EO crystal operating parameters of (1) providing the desired crystal voltage, (2) maintaining the EO crystal temperature within a desired range, and (3) positioning the EO crystal at a desired orientation with in terms of alignment with the laser beam passing therethrough. Further, what is needed is an EO crystal-mounted apparatus which is compact in size so as to allow for reduction in size of the laser cavity in which it is to be used. Essentially, what is needed is an EO crystal-mounted apparatus which incorporates voltage control, thermal control, and orientation/position control into one compact package ideal for low-SWAP environments.

Various aspects of the present disclosure are directed to providing electro-optical crystal-mounted apparatus and systems that integrates all three of the aforementioned parameters that affect EO crystal performance into one compact package. That is, various aspects of the present invention are capable of (1) applying over 1000 volts of electrical potential across the crystal without shorting to ground, (2) rigidly fixing the crystal in place within a mounting apparatus, so that the EO crystal can be held in alignment with respect to the laser beam, and (3) quickly conducting heat into the EO crystal to maintain the EO crystal's thermally stability, all while (4) providing lockable fine tip and/or tilt adjustment of the crystal, and vertical translation position alignment of the crystal with respect to the laser beam passing therethrough. Further, various aspects of the present disclosure are directed to providing an EO crystal-mounted apparatus which is compact in size as compared to conventional EO crystal-mounted apparatus, so as to allow for reduction in size of the laser cavity in which it is to be used.

Figure 1A:
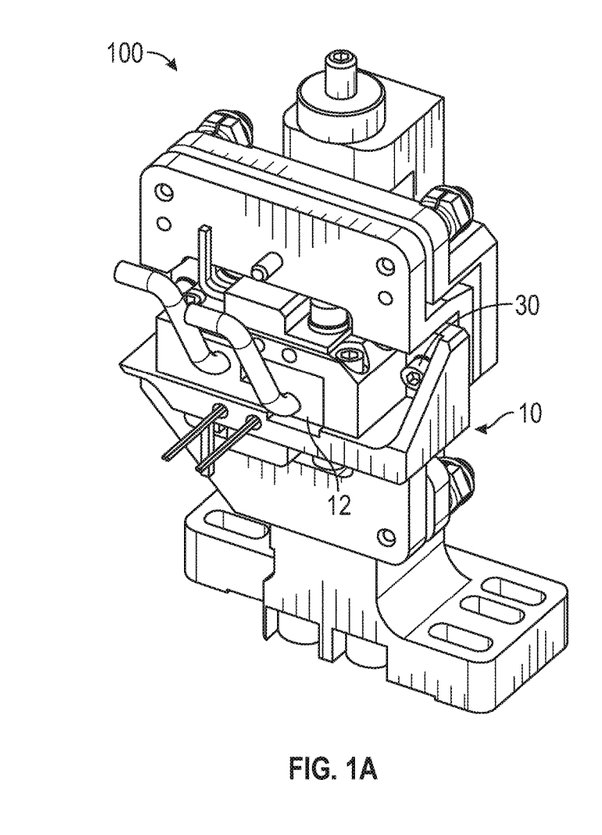
FIG. 1A illustrates a first view of an example of an electro-optical crystal-mounted apparatus.
Figure 1B:
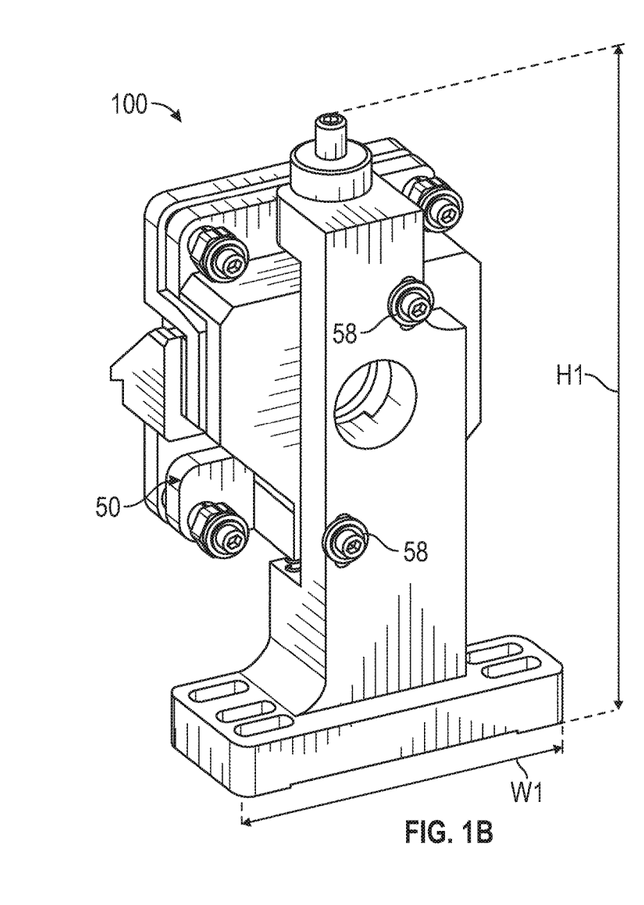
FIG. 1B illustrates a second view of an example of an electro-optical crystal-mounted apparatus.

FIG. 1A illustrates a first view of an example of an electro-optical crystal-mounted apparatus 100 and FIG. 1B illustrates a second view of an example of an electro-optical crystal-mounted apparatus 100. In some aspects, an electro-optical crystal-mounted apparatus 100 includes a compactly configured mounting sub-assembly 10 for holding an EO crystal 15 firmly in place while electrically insulating the EO crystal 15. As defined herein the term "compactly configured" refers to a size of the components of the electro-optical mounted apparatus in relation to conventional EO crystal mounts. For example, conventional EO crystal mounts typically are of a volume of 1.0 liters in size. In contrast, the electro-optical crystal-mounted apparatus 100 of the present disclosure if of about 0.1 liters in volume. Thus, the electro-optical crystal-mounted apparatus 100 and components thereof, e.g., the mounting sub-assembly 10 are compactly configured, achieving a 90% size reduction in size as compared with conventional EO crystal mounts. The mounting sub-assembly 10 may include a mount 12 onto which the EO crystal 15 is mounted. The mount 15 may include a cavity 14 in which the EO crystal 15 is securely housed to prevent undesired movement of the EO crystal 15 while mounted in the mount 12.

In some aspects, the mount 12 may include a thermally conductive and electrically insulating material so as to electrically insulate the EO crystal 15 when an electric potential is applied across of the EO crystal 15, while being capable of conducting heat from a nearby source to maintain the EO crystal 15 at a desired temperature for optimum performance. In some aspects, the thermally conductive and electrically insulating material may be Beryllium oxide (BeO) which has a high ratio of thermal conductivity to dielectric constant. The advantage of the mount 12 being thermally conductive is to allow the mount 12 to be able to transfer heat to the EO crystal 15 in order to maintain a desired temperature of the EO crystal 15. The advantage of the mount 12 being electrically insulating is so as to prevent any current flow in any direction of the crystal. In particular the aforementioned configuration is advantageous in that it prevents unwanted arcing to any adjacent metal material of the mount 15. Thus, it is possible to apply and electric potential across of the EO crystal 15 whilst isolating a flow of current from flowing therethrough.

Figure 2:
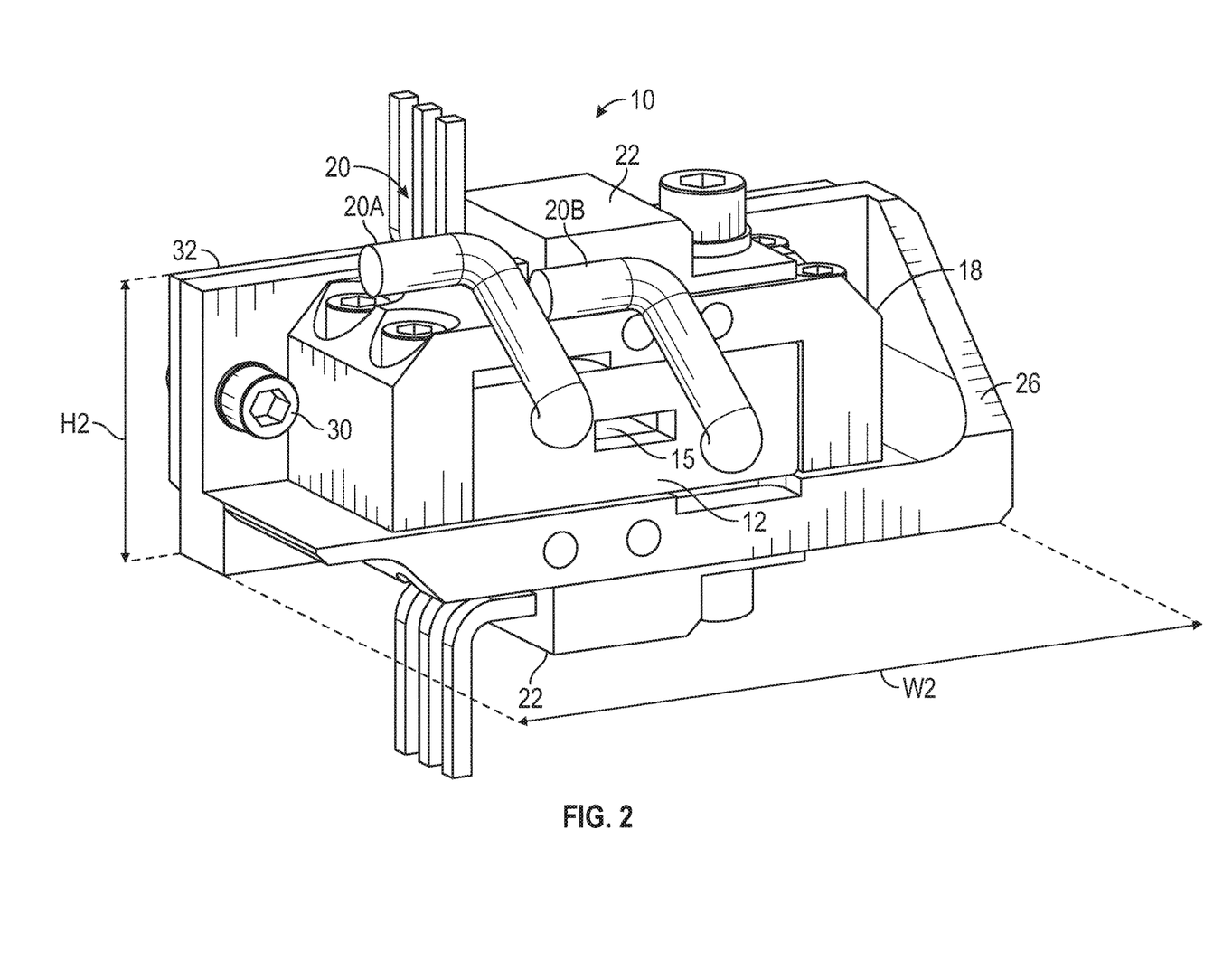
FIG. 2 illustrates a first view of an example of a mounting sub-assembly of the electro-optical crystal-mounted apparatus of FIG. 1A and FIG. 1B.
Figure 3:
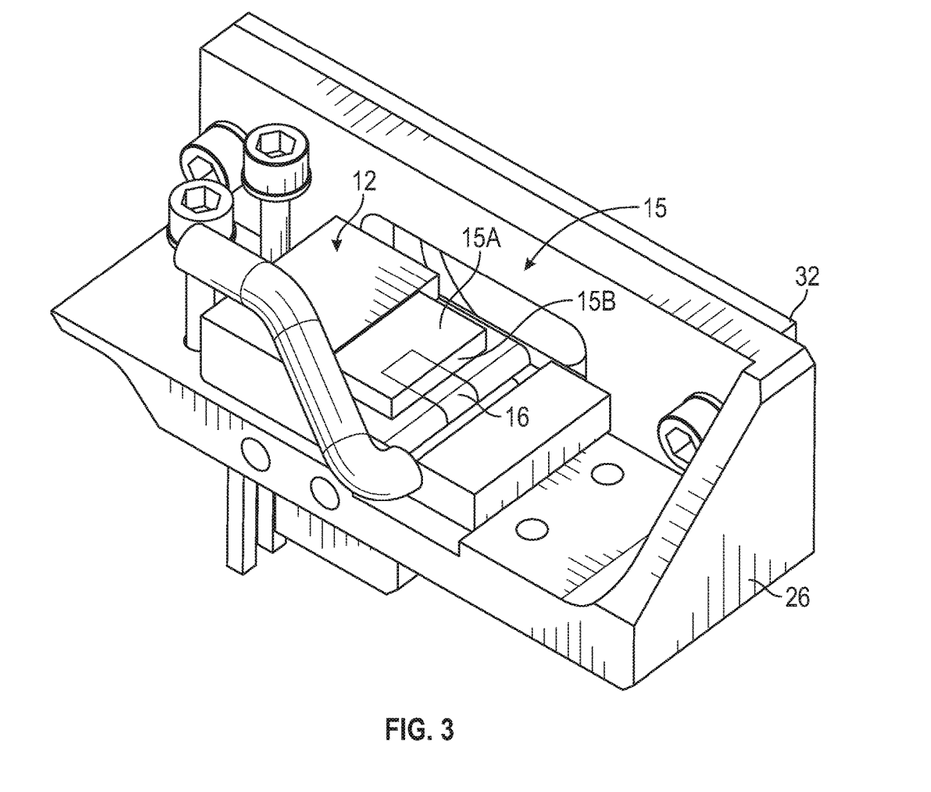
FIG. 3 illustrates a second view of an example of a mounting sub-assembly of the electro-optical crystal-mounted apparatus of FIG. 1A and FIG. 1B.

FIG. 2 illustrates a first view of an example of a compactly configured mounting sub-assembly 100 of the electro-optical crystal-mounted apparatus of FIG. 1A and FIG. 1B, and FIG. 3 illustrates a second view of an example of a mounting sub-assembly of the electro-optical crystal-mounted apparatus of FIG. 1A and FIG. 1B. As illustrated in FIG. 3, in some aspects, in order to allow an electrical potential to be applied to the EO crystal 15, a layer of electrically conductive material is disposed on at least a portion of the thermally conductive and electrically insulating mount 15. The layer of electrically conductive material 16 may be coupled to the electro-optical crystal and may be, for example, a gold plating. Alternatively, the layer of electrically conductive material 16 may be integrated into the thermally conductive and electrically insulating mount 15. In either configuration, the layer of electrically conductive material 16 (e.g., the gold plating) is configured to receive the electrical potential applied from the electrical wire 20 and to apply the electrical potential to the EO crystal 15. In contrast, the non-plated portion of the mount 12 insulates the electric potential from the surrounding metal mount parts (e.g., a sub-assembly oven, and a base of the sub-assembly oven) while allowing heat to quickly flow through the mount 12 for the thermal control requirement.

The electro-optical crystal-mounted apparatus 100 may further include an electrical wire 20 electrically coupled to the EO crystal 15 through the layer of electrically conductive material 16. The electric wire 20 may be a high voltage electrical wire capable of applying an electric potential of at least 1000V across the EO crystal 15. In some aspects, the electrical wire includes a first wire 20A electrically coupled to a first face of the electro-optical crystal and a second wire 20B electrically coupled to a second face of the electro-optical crystal. In some aspects the first and second faces are positioned opposite to each other to in order for the electrical potential to be applied across the EO crystal 15. In some aspects, the systems and apparatus of the present disclosure are capable of applying a voltage of at least 1000V in magnitude, without having a short to ground, in contrast to conventional EO crystal mounting devices.

Thus, in operation, the electro-optical crystal-mounted apparatus 100 works to hold the crystal firmly while electrically insulating it from the environment at the same time allowing heat to be quickly applied to the crystal via a nearby source as described below. An electric potential is applied across the electro-optical crystal 15 through the electrical wire 20. Since the mount 15 is electrically insulating, the electrical voltage is applied to the EO crystal 15 through the layer of electrically conductive material 16. Thus, it is possible to apply the electric voltage to the EO crystal 15 without imparting a current to the adjacent portions of the mount 12 surrounding the EO crystal 15.

Referring back to FIG. 2, the mounting sub-assembly 10 may further include a crystal sub-assembly oven 18 mounted to, and at least partially enclosing the mount 12 having the EO crystal 15, and a heater 22 thermally coupled to the crystal sub-assembly oven 18 for providing heat to the EO crystal 15. The heater 22 is configured to apply a steady or desired amount of heat to the crystal sub-assembly oven 18. In some aspects, the crystal sub-assembly oven 18 is made of a material which has superior heat absorption and retention properties. For example the crystal sub-assembly oven 18 may be made of a metal having a high thermal conductivity, e.g. aluminum. The configuration of the crystal sub-assembly oven 18 however is not limited thereto, and other materials or metals having high thermal conductivity may be substituted for aluminum, for example copper. In conjunction with the heater 22, the crystal sub-assembly oven 18 is used to maintain the temperature of the EO crystal 15 at the desired value or range of values for optimal optical performance. That is, a temperature of the heater can be varied accordingly to either reduce or increase the amount of heat to be applied to the crystal sub-assembly oven 18.

Due to the crystal sub-assembly oven 18 being made of a material having high thermal conductivity, e.g. aluminum, the crystal sub-assembly oven is able to quickly absorb heat from the heater 22, and correspondingly transferred this heat to the EO crystal 15. Due to the nature of the high thermal conductivity material of which the crystal sub-assembly oven 18 is made, the crystal sub-assembly oven 18 is able to adequately conduct heat energy and transfer this heat energy to the mount 12. Thus, the mounting sub-assembly 10 is configured such that an electric potential may be applied across the EO crystal 15 without any unwanted current flowing therethrough as a result of the insulating material of the mount 12 at least partially enclosing and contacting the EO crystal 15.

Figure 4:
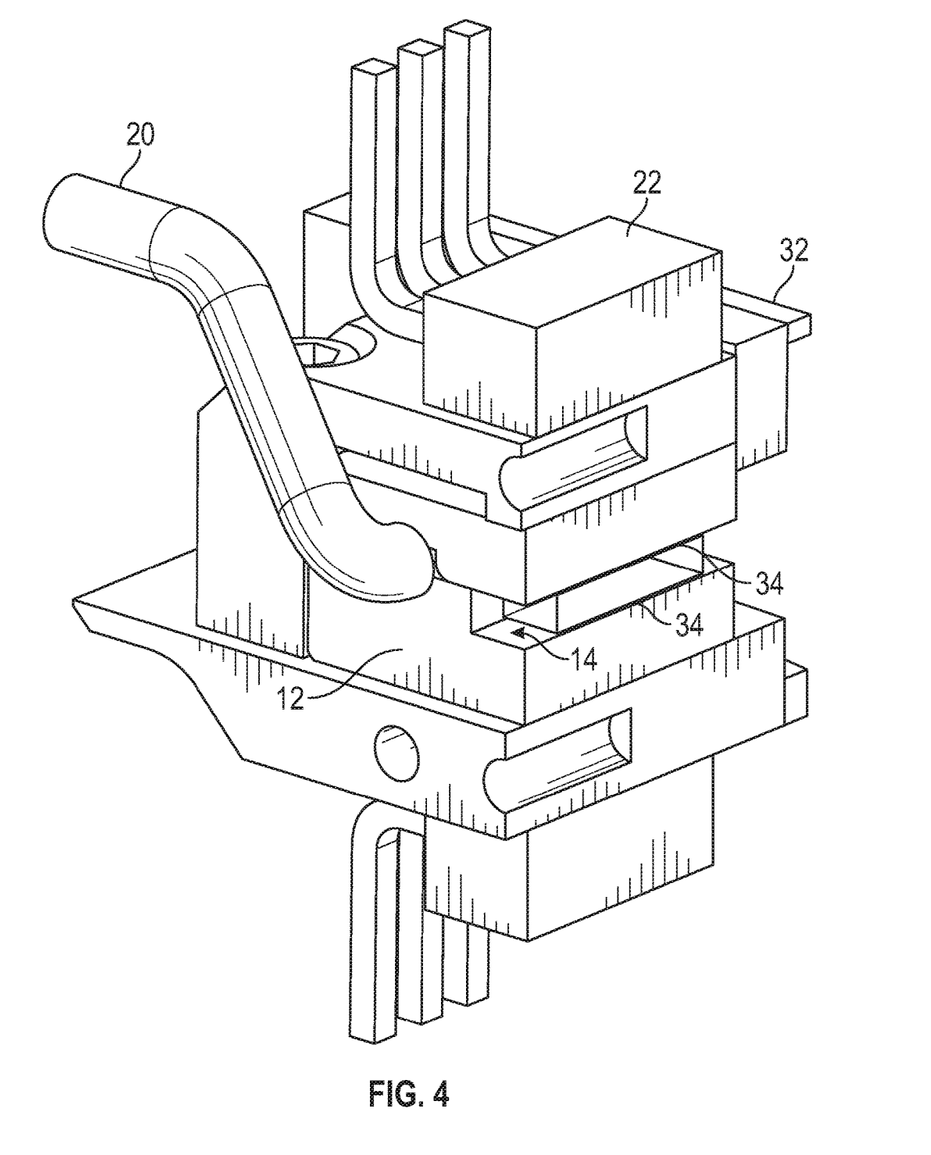
FIG. 4 illustrates a third view of an example of a mounting sub-assembly of the electro-optical crystal-mounted apparatus of FIG. 1A and FIG. 1B.

FIG. 4 illustrates a third view of an example of a mounting sub-assembly of the electro-optical crystal-mounted apparatus of FIG. 1A and FIG. 1B. As illustrated in FIG. 4, the EO crystal 15 may be fixedly mounted within the cavity 14 of the mount using an epoxy 34 to prevent movement of the EO crystal 15 within the mount 12. In some aspects, the epoxy 34 may be an electrically conductive epoxy positioned between the electrically conductive portion of the mount 12 (i.e., the portion of the mount 12 having the electrically conductive layer disposed thereon) and the EO crystal 15. The aforementioned configuration of the epoxy 34 being in an electrically conductive epoxy facilitates application of the electric potential from the electrically conductive layer 16 to the EO crystal 15. in this sense, the electric potential is able to be applied to the crystal without the epoxy 34 potentially acting as an insulator or acting in any way to inhibit application of the electric potential to the EO crystal 15.

In accordance with some aspects of the present disclosure, the mounting sub-assembly 10 may further include a mounting sub-assembly base 26 on which the mounting sub-assembly 10 is mounted and supported. As illustrated in FIG. 1A and FIG. 1B, the electro-optical crystal-mounted apparatus 100 may further include a compactly configured position adjustment sub assembly 50, and the mounting sub-assembly 10 may thus be mounted on and coupled to the position adjustment sub assembly 50 by inserting a coupling member 30 into corresponding mounting assembly coupling points 51 (shown in FIG. 5). To this effect, a hole may be drilled through the thermal insulator 32 to accommodate a coupling member 30 therein for the coupling of the mounting sub-assembly 10 to the compactly configured position adjustment sub-assembly 50. The coupling member 30 may be a bolt, a screw, or any other similar fastener. In some aspects, a thermal insulator 32 may be interposed between the mounting sub-assembly base 26 and the position adjustment sub-assembly 50. The disposing the thermal insulator 32 between the mounting sub-assembly 10 and the position adjustment sub-assembly 50 yields the advantage of isolating the heat from the heater 22 and the crystal sub-assembly oven 18 to the mounting sub-assembly 10. As a result undesired heat loss or waste from the mounting sub-assembly 10 to the position adjustment sub-assembly 50 is minimized. Since waste or loss of heat is minimized, it is possible to use a heater of lower capacity and smaller size.

As illustrated in FIG. 2, a maximum height (H2) of the mounting sub-assembly base in a first plane may be equal to 12.70 millimeters (mm) (0.5 inches), and a maximum width (W2) of the mounting sub-assembly base defined in a second plane is equal to 40.64 mm (1.6 inches). The second plane may be oriented perpendicular to the first plane, for example in some aspects, the first plane may be the XY plane, and the second plane may be the XZ plane. However, the aforementioned configuration is not limited thereto. The aforementioned configurations where a size of the mounting sub-assembly 10 and its various components e.g., the heater 22 are minimized in size, i.e., are compactly configured, is advantageous in that the size of the mounting sub-assembly 10 is limited to the size of the laser cavity in which it will be used. It is desirable for the size of the laser cavity to be minimized for efficiency purposes, more specifically to minimize a length or duration of each laser pulse.

Figure 5:
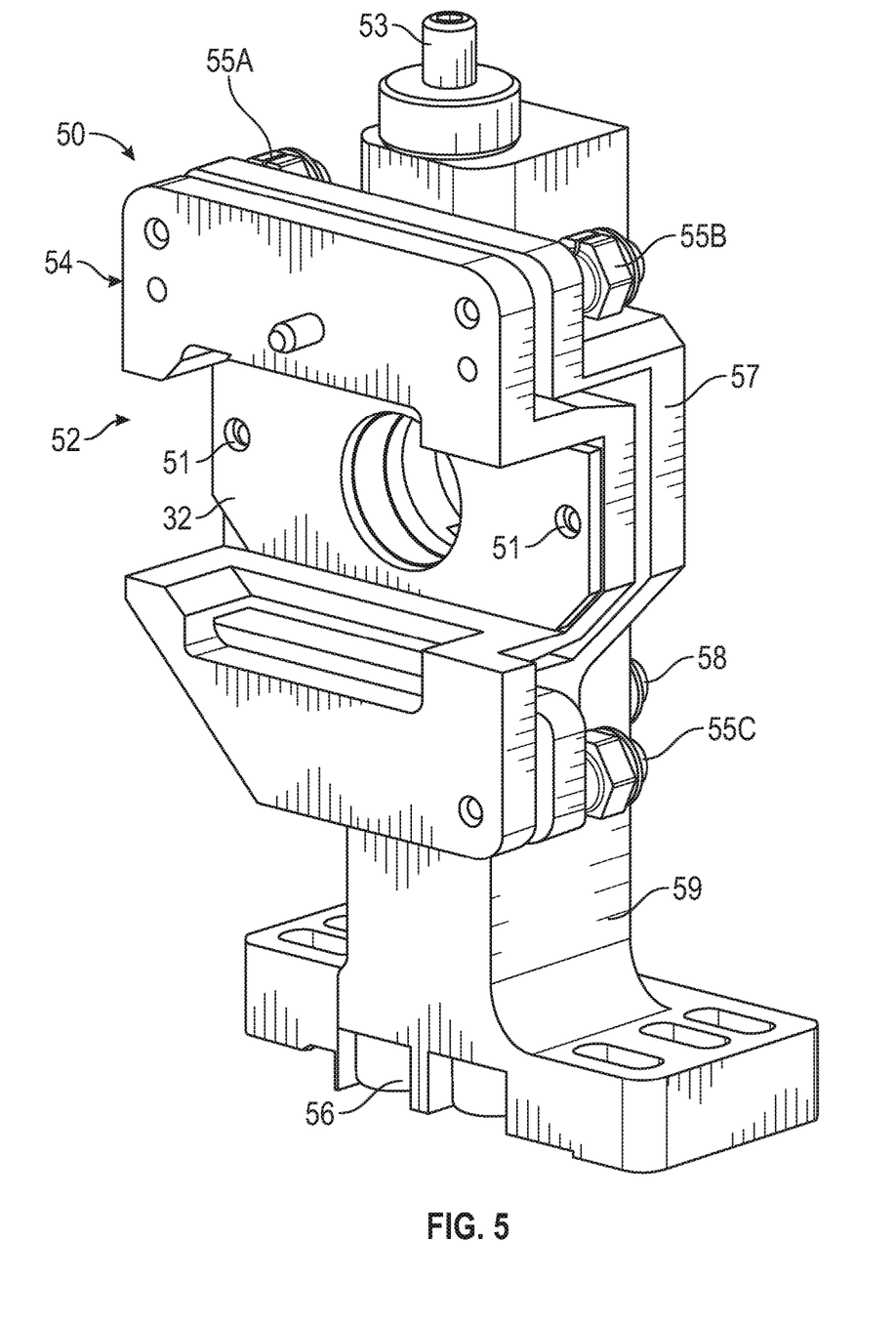
FIG. 5 illustrates an example of a position adjustment sub-assembly of the electro-optical crystal-mounted apparatus of FIG. 1A and FIG. 1B.

FIG. 5 illustrates an example of a position adjustment sub-assembly of the electro-optical crystal-mounted apparatus of FIG. 1A and FIG. 1B. As illustrated in FIG. 5, the EO crystal-mounted apparatus 100 may further include the position adjustment sub-assembly 50 onto which the mounting sub-assembly 10 is mounted. In some aspects, the position adjustment sub-assembly 50 serves the purpose of positioning and orienting the EO crystal 15 with respect to a laser beam configured to pass through the EO crystal 15. Further, the position adjustment sub-assembly 50 retains the thermal and electrical isolation of the crystal mounting assembly that the EO crystal 15 requires to operate properly. To this effect, the position adjustment sub-assembly 50 may include at least one tilt/tip adjuster 52 for adjusting at least one of a tip and a tilt of the EO crystal 15 with respect to the laser beam.

In some aspects, the tilt/tip adjuster 52 may include a tilt/tip adjuster mount 54 rotationally coupled to a stationary base 57 of the position adjustment sub-assembly 50. The mounting sub-assembly 10 may be mounted on and supported within the tilt/tip adjuster mount 54 in a compact configuration. As illustrated in FIGS. 1A and 1B, and with further reference to FIG. 5, the stationary base 57 may be coupled to and configured to support the tilt/tip adjuster mount 54 with the mounting sub-assembly 10 mounted thereon. The position adjustment sub-assembly 50 may further include a displacement connector 55 disposed at least partially between the tilt/tip adjuster mount 54 and the stationary base 57 to tilt the tilt/tip adjuster mount 54 and the mounting sub-assembly 10 containing the EO crystal 15 about a vertical axis of the mounting sub-assembly 10. Similarly, the displacement connector 55 is configured to tip the tilt/tip adjuster mount 54 and the mounting sub-assembly 10 about a horizontal axis of the mounting sub-assembly 10.

Figure 6:
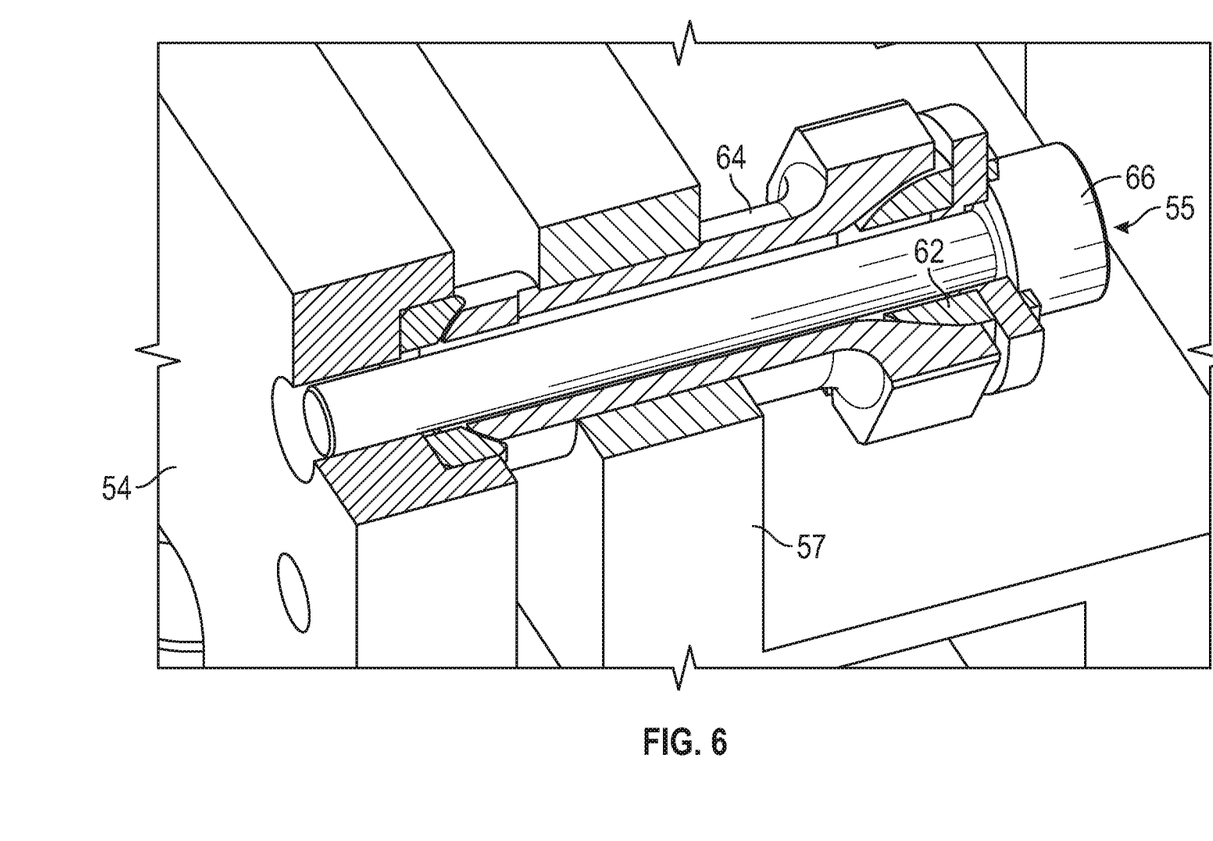
FIG. 6 illustrates an example of an exploded view of a portion of a tilt/tip adjuster of the position adjustment sub-assembly of FIG. 5.

FIG. 6 illustrates an example of an exploded view of a portion of a tilt/tip adjuster of the position adjustment sub-assembly of FIG. 5. In some aspects, the displacement connector 55 includes first, second, and third displacement connectors 55A, 55B, and 55C. In these aspects, the tilting of the tilt/tip adjuster mount 54 comprises rotating a first one 55A of the first, second, and third displacement connectors 55A, 55B, and 55C while holding the remaining two 55B and 55C of the first, second, and third displacement connectors 55A, 55B, and 55C in a fixed position. Similarly, the tipping of the tilt/tip adjuster mount 54 comprises rotating a second one 55C of the first, second, and third displacement connectors 55A, 55B, and 55C while holding the remaining two 55A and 55B of the first, second, and third displacement connectors 55A, 55B, and 55C in a fixed position.

In some aspects, the displacement connector 54, that is, first, second, and third displacement connectors 55A, 55B, and 55C may be a lockable fine pitch adjustment screw. In these aspects, the displacement connector 55, that is, the fine pitch adjustment screw may include a screw locker cone 62 configured to lock the fine pitch adjustment screw in a desired position so as to orient the EO crystal 15 at a desired tip or tilt angle with respect to the laser beam. In some aspects, the fine pitch adjustment screw 64 may include a locking screw 66 disposed axially therein. The locking screw 66 then screws into the tilt/tip adjustment mount 54 and pulls the tilt/tip adjustment mount 54 into the fine pitch adjustment screw 64. In order to adjust a position of the tilt/tip adjustment mount 54 with respect to the stationary base 57, that is, in order to perform the tilting or the tipping, the adjustment screw 64 is rotated a desired angle while being pushed inwards towards the tilt/tip adjustment mount 54. When the desired tip or tilt angle is reached the locking screw 66 is tightened by being threadedly coupled to the tilt/tip adjustment mount 54, thereby fixing a position of the tilt/tip adjustment mount 54 with respect to the stationary base 57. Once the locking screw 66 is tightened, this causes the screw locker cone 62 to be pushed into the adjustment screw 64, causing the adjustment screw 64 to split along a slit formed axially in the body of the adjustment screw 64. The adjustment screw 64 is locked by this splitting action caused by the screw locker cone 62 so that the adjustment screw 64 can no longer rotate, as it is bound into the stationary base 57 by the tensile forces caused by tightening the locking screw 66.

Referring back to FIG. 5, the EO crystal-mounted apparatus 100 may further include a height adjuster for adjusting a height of the EO crystal 15 along a vertical axis of the position adjustment sub-assembly 50 with respect to the laser beam. In some aspects, the height adjuster may include an elastic member 56 to bias the mount 12 to a neutral position within the position adjustment sub-assembly 50. For the purposes of this disclosure, the neutral position refers to a position in which the mounting sub-assembly 10 is mounted in position adjustment sub-assembly 50 before any displacement of the mounting sub-assembly 10 along the vertical axis of the position adjustment sub-assembly 50. The height adjuster may further include an actuator an actuator 53 to displace the mounting sub-assembly from the neutral position along the vertical axis, and a locking member 58 to retain the mounting sub-assembly in a desired position other than the neutral position. In some aspects the actuator 53 may be a threaded rod 53 similar to a screw, and the locking member 58 may be correspondingly threaded to match the rod so as to lock the rod 53 and the locking member 58 through a threaded connection. In some aspects the elastic member 56 may be a return spring coupled to the actuator and configured to bias the mounting sub-assembly 10 in the neutral position when the actuator 53 has not been actuated. Further the return spring 56 may be configured to return mounting sub-assembly 10 back to the neutral position when the threaded connection between the actuator 53 and the locking member 58 is released.

One or more implementations disclosed herein provide advantages over the prior art of providing an EO crystal-mounted apparatus capable of optimizing all three parameters on which the EO crystal optical performance depends. That is, the systems and apparatus of the present disclosure are directed to providing an EO crystal-mounted device capable of providing a desired electrical potential of over 1000V across the EO crystal to provide adequate temperature control without shorting to the ground and without transferring an undesired current flow to the EO crystal. The systems and apparatus of the present disclosure are additionally directed to providing an opto-mechanical mount capable of rigidly fixing the crystal so it may be held in a desired tilt or tip angle, and capable of providing lockable fine adjustment in terms of the desired tilt or tip angle, as well as translation of position of the EO crystal along a vertical axis of the crystal-mounted device. Additionally, various aspects of the present disclosure are directed to providing an EO crystal-mounted apparatus capable of quickly conducting heat into the EO crystal and maintaining thermal stability of the EO crystal.

In accordance with some aspects, the position adjustment sub-assembly further includes a position adjustment sub-assembly base 59 to which the stationary base 57 is coupled. to these aspects, a maximum height (H1) of the position adjustment sub-assembly in a first plane is equal to 76.20 mm (3 inches). Additionally, a maximum width of the position adjustment sub-assembly base 59 defined in a second plane is equal to 45.72 mm (1.8 inches). The second plane may be oriented perpendicular to the first plane, for example in some aspects, the first plane may be the XY plane, and the second plane may be the XZ plane. However, the aforementioned configuration is not limited thereto. Thus, one or more implementations of the present disclosure present the advantage over the prior art of providing an EQ crystal-mounted apparatus of a reduced/compact size in order to allow minimization of size of the laser cavity in which the EQ crystal-mounted apparatus will be used. As discussed above, it is desirable to limit the size of the laser cavity in which the EO crystal-mounted apparatus will be used for efficiency purposes, specifically to minimize a length or duration of each laser pulse.

Various examples of aspects of the disclosure are described below as clauses for convenience. These are provided as examples, and do not limit the subject technology.

Clause 1: An electro-optical crystal-mounted apparatus, the apparatus comprising: a compactly configured mounting sub-assembly, comprising: a mount including: a thermally conductive and electrically insulating material, having a cavity; an electro-optical crystal being housed within the cavity; and a layer of electrically conductive material disposed on at least a portion of the thermally conductive and electrically insulating material, the layer of electrically conductive material coupled to the electro-optical crystal; a crystal sub-assembly oven mounted to, and at least partially enclosing the mount having the electro-optical crystal; and a heater thermally coupled to the crystal sub-assembly oven for providing heat to the electro-optical crystal; and an electrical wire electrically coupled to the layer of electrically conductive material.

Clause 2: The apparatus of Clause 1, wherein the thermally conductive and electrically insulating material comprises Beryllium oxide.

Clause 3: The apparatus of Clause 1, wherein the electro-optical crystal is fixedly mounted within the cavity of the mount using an electrically conductive epoxy to prevent movement of the electro-optical crystal within the mount.

Clause 4: The apparatus of Clause 1, wherein the layer of electrically conductive material comprises a layer of gold plating configured to receive an electrical potential applied from the electrical wire and to apply the electrical potential to the electro-optical crystal.

Clause 5: The apparatus of Clause 4, wherein the electrical wire comprises a first wire electrically coupled to a first side of the electro-optical crystal and a second wire electrically coupled to a second side of the electro-optical crystal to apply an electrical potential of at least 1000V across the electro-optical crystal.

Clause 6: The apparatus of Clause 1, wherein the compactly configured mounting sub-assembly further comprises a mounting sub-assembly base on which the mounting sub-assembly is mounted and supported.

Clause 7: The apparatus of Clause 6, wherein: a maximum height of the mounting sub-assembly base in a first plane is equal to 12.70 mm (0.5 inches); and a maximum width of the mounting sub-assembly base defined in a second plane is equal to 40.64 mm (1.6 inches), wherein the second plane is oriented perpendicular to the first plane.

Clause 8: The apparatus of Clause 1, further comprising: a compactly configured position adjustment sub-assembly onto which the mounting sub-assembly is mounted, the position adjustment sub-assembly for positioning the electro-optical crystal with respect to a laser beam configured to pass through the electro-optical crystal, the position adjustment sub-assembly comprising at least one tilt/tip adjuster for adjusting at least one of a tip and a tilt of the electro-optical crystal with respect to the laser beam.

Clause 9: The apparatus of Clause 8, further comprising a thermal insulator disposed between the mounting sub-assembly and the position adjustment sub-assembly for thermal insulation therebetween.

Clause 10: The apparatus of Clause 8, wherein the tilt/tip adjuster comprises: a tilt/tip adjuster mount rotationally coupled to a stationary base of the position adjustment sub-assembly, wherein: the mounting sub-assembly is mounted on the tilt/tip adjuster mount; and the stationary base is configured to support the tilt/tip adjuster mount with the mounting sub-assembly mounted thereon; and a displacement connector disposed at least partially between the tilt/tip adjuster mount and the stationary base to tilt the tilt/tip adjuster mount and the mounting sub-assembly about a horizontal axis of the mounting sub-assembly, and to tip the tilt/tip adjuster mount and the mounting sub-assembly about a vertical axis of the mounting sub-assembly.

Clause 11: The apparatus of Clause 10, wherein the displacement connector comprises first, second, and third displacement connectors; and the tilting of the tilt adjuster mount comprises rotating a first one of the first, second, and third displacement connectors while holding the remaining two of the first, second, and third displacement connectors in a fixed position; and the tipping of the adjuster mount comprises rotating a second one of the first, second, and third displacement connectors while holding the remaining two of the first, second, and third displacement connectors in a fixed position.

Clause 12: The apparatus of Clause 11, wherein the displacement connector comprises a lockable fine pitch adjustment screw.

Clause 13: The apparatus of Clause 12, wherein the displacement connector comprises a screw locker cone configured to lock the fine pitch adjustment screw in a desired position so as to orient the electro-optical crystal at a desired tilt or tip angle with respect to the laser beam.

Clause 14: The apparatus of Clause 8, further comprising a height adjuster for adjusting a height of the electro-optical crystal along a vertical axis of the position adjustment sub-assembly, with respect to the laser beam.

Clause 15: The apparatus of Clause 14, wherein the height adjuster comprises: an elastic member to bias the mount to a neutral position within the position adjustment sub-assembly; an actuator to displace the mounting sub-assembly from the neutral position along the vertical axis, with respect to the position adjustment sub-assembly; and a locking member to retain the mounting sub-assembly in a desired position other than the original position.

Clause 16: The apparatus of Clause 8, wherein the compactly configured position adjustment sub-assembly further comprises a stationary base, and a position adjustment sub-assembly base to which the stationary base is coupled, and wherein: a maximum height of the position adjustment sub-assembly in a first plane is equal to 76.20 mm (3 inches): and a maximum width of the position adjustment sub-assembly base defined in a second plane is equal to 45.72 mm (1.8 inches), wherein the second plane is oriented perpendicular to the first plane.

Clause 17: An electro-optical crystal-mounted system, comprising: a compactly configured mounting sub-assembly, comprising: a thermally conductive mount having a cavity defined therein; an electro-optical crystal housed within the cavity, wherein at least a portion of the thermally conductive mount is gold-plated; a crystal sub-assembly oven thermally coupled to a heater, the crystal sub-assembly oven at least partially enclosing the thermally conductive mount, and the crystal sub-assembly oven configured to maintain a temperature of the electro-optical crystal within the thermally conductive mount; an electrical wire electrically coupled to the gold-plated portion of the thermally conductive mount, wherein the thermally conductive mount is electrically insulating to prevent a flow of current to the electro-optical crystal; and a compactly configured position adjustment sub-assembly comprising at least two lockable tilt/tip adjusters, and onto which the mounting sub-assembly is mounted for positioning the electro-optical crystal with respect to a laser beam configured to pass through the electro-optical crystal.

Clause 18: The system of Clause 17, wherein the thermally conductive and electrically insulating mount comprises Beryllium oxide.

Clause 19: The system of Clause 17, wherein: a maximum height of a base of the compactly configured mounting sub-assembly in a first plane is equal to 12.70 mm (0.5 inches); and a maximum width of the base of the compactly configured mounting sub-assembly defined in a second plane is equal to 40.64 mm (1.6 inches), wherein the second plane is oriented perpendicular to the first plane.

Clause 20: The system of Clause 17, wherein the compactly configured position adjustment sub-assembly further comprises a stationary base, and a position adjustment sub-assembly base to which the stationary base is coupled, and wherein: a maximum height of the position adjustment sub-assembly base defined in a first plane is equal to 76.20 mm (3 inches); a maximum width of the position adjustment sub-assembly base defined in a second plane is equal to 45.72 mm (1.8 inches); and the first plane is perpendicular to the second plane.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional of over one word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. An electro-optical crystal-mounted apparatus, the apparatus comprising:
  a mounting sub-assembly, comprising:
    a mount including:
      a thermally conductive and electrically insulating at ial, having a cavity;
      an electro-optical crystal being housed within the cavity; and
      a layer of electrically conductive material disposed on at least a portion of the thermally conductive and electrically insulating material, the layer of electrically conductive material coupled to the electro-optical crystal;

a crystal sub-assembly oven mounted to, and at least partially enclosing the mount having the electro-optical crystal; and
a heater thermally coupled to the crystal sub-assembly oven for providing heat to the electro-optical crystal;
an electrical wire electrically coupled to the layer of electrically conductive material;
a position adjustment sub-assembly onto which the mounting sub-assembly is mounted for positioning the electro-optical crystal with respect to a laser beam configured to pass through the electro-optical crystal; and
a thermal insulator disposed between the mounting sub-assembly and the position adjustment sub-assembly, the thermal insulator extending continuously across an entire common width between a base of the mounting sub-assembly and the position adjustment sub-assembly for thermal insulation therebetween.

2. The apparatus of claim 1, wherein the thermally conductive and electrically insulating material comprises Beryllium oxide.

3. The apparatus of claim 1, wherein the electro-optical crystal is fixedly mounted within the cavity of the mount using an electrically conductive epoxy to prevent movement of the electro-optical crystal within the mount.

4. The apparatus of claim 1, wherein the layer of electrically conductive material comprises a layer of gold plating configured to receive an electrical potential applied from the electrical wire and to apply the electrical potential to the electro-optical crystal.

5. The apparatus of claim 4, wherein the electrical wire comprises a first wire electrically coupled to a first side of the electro-optical crystal and a second wire electrically coupled to a second side of the electro-optical crystal to apply an electrical potential of at least 1000V across the electro-optical crystal.

6. The apparatus of claim 1, wherein the mounting sub-assembly further comprises a mounting sub-assembly base on which the mounting sub-assembly is mounted and supported.

7. The apparatus of claim 6, wherein:
a maximum height of the mounting sub-assembly base in a first plane is equal to 12.70 mm (0.5 inches); and
a maximum width of the mounting sub-assembly base defined in a second plane is equal to 40.64 mm (1.6 inches), wherein the second plane is oriented perpendicular to the first plane.

8. The apparatus of claim 1,
wherein the position adjustment sub-assembly comprises:
at least one tilt/tip adjuster for adjusting at least one of a tip and a tilt of the electro-optical crystal with respect to the laser beam.

9. The apparatus of claim 8, wherein the tilt/tip adjuster comprises:
a tilt/tip adjuster mount rotationally coupled to a stationary base of the position adjustment sub-assembly, wherein:
the mounting sub-assembly is mounted on the tilt/tip adjuster mount; and
the stationary base is configured to support the tilt/tip adjuster mount with the mounting sub-assembly mounted thereon; and
a displacement connector disposed at least partially between the tilt/tip adjuster mount and the stationary base to tilt the tilt/tip adjuster mount and the mounting sub-assembly about a horizontal axis of the mounting sub-assembly, and to tip the tilt/tip adjuster mount and the mounting sub-assembly about a vertical axis of the mounting sub-assembly.

10. The apparatus of claim 9, wherein the displacement connector comprises first, second, and third displacement connectors; and
the tilting of the tilt/tip adjuster mount comprises rotating a first one of the first, second, and third displacement connectors while holding the remaining two of the first, second, and third displacement connectors in a fixed position; and
the tipping of the tilt/tip adjuster mount comprises rotating a second one of the first, second, and third displacement connectors while holding the remaining two of the first, second, and third displacement connectors in a fixed position.

11. The apparatus of claim 10, wherein each displacement connector comprises a lockable fine pitch adjustment screw.

12. The apparatus of claim 11, wherein the displacement connector comprises a screw locker cone configured to lock the fine pitch adjustment screw in a desired position so as to orient the electro-optical crystal at a desired tilt or tip angle with respect to the laser beam.

13. The apparatus of claim 8, further comprising a height adjuster for adjusting a height of the electro-optical crystal along a vertical axis of the position adjustment sub-assembly, with respect to the laser beam.

14. The apparatus of claim 13, wherein the height adjuster comprises:
an elastic member to bias the mount to a neutral position within the position adjustment sub-assembly;
an actuator to displace the mounting sub-assembly from the neutral position along the vertical axis, with respect to the position adjustment sub-assembly; and
a locking member to retain the mounting sub-assembly in a desired position other than the neutral position.

15. The apparatus of claim 8, wherein the position adjustment sub-assembly further comprises a stationary base, and a position adjustment sub-assembly base to which the stationary base is coupled, and wherein:
a maximum height of the position adjustment sub-assembly in a first plane is equal to 76.20 mm (3 inches); and
a maximum width of the position adjustment sub-assembly base defined in a second plane is equal to 45.72 mm (1.8 inches), wherein the second plane is oriented perpendicular to the first plane.

16. An electro-optical crystal-mounted system, comprising:
a mounting sub-assembly, comprising:
a thermally conductive mount having a cavity defined therein;
an electro-optical crystal housed within the cavity, wherein at least a portion of the thermally conductive mount includes a gold-plated layer;
a crystal sub-assembly oven thermally coupled to a heater, the crystal sub-assembly oven at least partially enclosing the thermally conductive mount, and the
crystal sub-assembly oven configured to maintain a temperature of the electro-optical crystal within the thermally conductive mount;
an electrical wire electrically coupled to the gold-plated portion of the thermally conductive mount, wherein the thermally conductive mount is electrically insulating to prevent a flow of current to the electro-optical crystal;
a position adjustment sub-assembly comprising at least two lockable adjustment screws, and onto which the mounting sub-assembly is mounted for positioning the electro-optical crystal with respect to a laser beam configured to pass through the electro-optical crystal; and a thermal insulator disposed between the mounting sub-assembly and the position adjustment sub-assembly, the thermal insulator extending continuously across an entire common width between a base of the mounting sub-assembly and the position adjustment sub-assembly for thermal insulation therebetween.

17. The system of claim 16, wherein the thermally conductive and electrically insulating mount comprises Beryllium oxide.

18. The system of claim 16, wherein:
a maximum height of a base of the mounting sub-assembly defined in a first plane is equal to 12.70 mm (0.5 inches); and
a maximum width of the base of the mounting sub-assembly defined in a second plane is equal to 40.64 mm (1.6 inches), wherein the second plane is oriented perpendicular to the first plane.

19. The system of claim 16, wherein the position adjustment sub-assembly further comprises a stationary base, and a position adjustment sub-assembly base to which the stationary base is coupled, and wherein:
a maximum height of the position adjustment sub-assembly base defined in a first plane is equal to 76.20 mm (3 inches);
a maximum width of the position adjustment sub-assembly base defined in a second plane is equal to 45.72 mm (1.8 inches); and
the first plane is oriented perpendicular to the second plane.

* * * * *